United States Patent Office 2,810,752
Patented Oct. 22, 1957

2,810,752

PREPARATION OF BETA AMINO PROPIONATE SURFACTANTS

Royce G. Freese, Minneapolis, Minn., assignor to General Mills, Inc., a corporation of Delaware No Drawing. Application May 29, 1953,
Serial No. 358,523

3 Claims. (Cl. 260—534)

The present invention relates to improvement in beta amino propionate surfactants. These surfactants are compounds having the following formula:

$$RNHCH_2CH_2COOM$$

in which R is a long chain aliphatic hydrocarbon group containing from 8–22 carbon atoms, and M is a salt-forming group. These surfactants may be made by the reaction of a primary fatty amine and an acrylic acid ester as disclosed in Isbell Patent 2,468,012.

The most desirable compounds of this type are those in which the R group contains 12 carbon atoms. These compounds are prepared from the amines prepared from coconut oil fatty acids.

Heretofore it has been impossible to prepare these products from undistilled fatty amines. This has been highly undesirable since in the current market distilled amines are quoted at a price differential of approximately 7–19¢ a pound over the price of the undistilled amines. This broad price differential is due in part to the fact that on distillation of a crude mixture of amines an unusable residue of from 10–30% results.

Still another disconcerting factor has heretofore been attendant the use of the beta amino propionates as detergents. It has been noted at times that certain batches of product do not possess the foam characteristics and the foam stabilization properties for which these detergents are ordinarily considered outstanding. Heretofore has been no explanation for this inconsistency. According to the present invention a procedure is outlined for treating the products in order to avoid these inconsistencies in foaming properties.

It is, therefore, an object of the present invention to provide a novel process of producing beta amino propionate surfactants employing undistilled fatty amines and producing products of consistently high surfactant characteristics.

It is another object of the present invention to provide novel beta amino propionate surfactant products possessing the above properties.

As was mentioned above, these compounds are prepared by the condensation of a fatty amine with an acrylic acid ester such as the methyl, ethyl, propyl and butyl acrylic esters. The amino propionate ester thus produced is hydrolyzed to the free acid, or more conveniently it is converted to a salt such as the sodium salt. Other salt-forming alkalis or alkali metals may be used, and thus there may result lithium salts, potassium salts, ammonium salts, and salts with organic bases such as choline, ethanolamine, diethanolamine, triethanolamine and the like. The conditions for the condensation and for the saponification are described in the above Isbell patent and need not be elaborated here. The reaction conditions do not appear to be critical from the standpoint of time and temperature, and the exact ratio of reagents is also not critical as long as a slight excess of the acrylic ester is present.

The invention comprises the discovery that when compounds of this type are made from undistilled amines there is present in the hydrolysis or saponification mixture some finely divided suspended material which interferes with the surfactant product. This material may be removed from an aqueous solution of the salt at a pH at which the solution has a minimum or at least a very low viscosity. Generally this pH is in the range of 6.5 to 11.0 except for the range of 8–10. The solution may have a concentration of the detergent of from 1–35% and preferably from 5–20% for this particular purpose. When the pH has been adjusted so that the solution has a low viscosity, the suspended material may be removed in any of a number of ways such as by filtration, centrifugation, winterizing techniques, coagulation by the use of gums, inorganic salts and other coagulants or in general by any procedure ordinarily employed for the separation of relatively small amounts of solid material from a large amount of liquid or solution.

Particular improvement is noted in the foaming properties of the material. Whereas the material containing suspended impurities may foam very poorly, the foaming properties as measured by the standard Ross-Miles test, of the material free from suspended materials may improve by 200–300%. Detergency, ability to lower surface tension, wetting, and other properties ordinarily considered important for commercial surface active agents are also improved by the removal of suspended material. The material which is suspended is relatively difficult to remove, and in some instances may require several filtrations using filter aids in order to obtain optimum results. The amount of material which may be removed in this way may vary from 1–20%, but generally is in the range of 5–10%.

Example 1

A sodium salt of N-alkyl β aminopropionate detergent was prepared from a crude amine obtained from coconut oil. This amine had the following properties:

Percent amine _____ 82.0
Percent secondary amine _____ 5.3
Amine number _____ 235.7

The condensation with methyl acrylate and the saponification was carried out as described in the Isbell patent, 2,468,012. The sodium salt was obtained as a 20% aqueous solution. This material was adjusted to a pH of 10.5. This product is referred to below as compound A.

Compound A was filtered at room temperature, a small amount of filter aid having been included to facilitate the operation. The filtered material is referred to below as compound B.

The amine described above was distilled to obtain 85.5% of distillate and 14.5% of residue. The distillate had the following properties:

Percent primary amine _____ 95.0
Percent secondary amine _____ 1.74
Amine number _____ 259.5

This primary amine was converted to the sodium salt of an N-alkyl β aminopropionate by the previous described procedure. As in the first portion of this example, a 20% aqueous solution was made and the pH of this solution was adjusted to 10.5. This material is referred to below as compound C.

The foaming ability and foam stability of compounds A, B, and C were measured by the Ross-Miles apparatus at a pH of 9.0 and a concentration of 0.1%. The Ross-Miles test is commonly used to measure foaming properties. The following results were obtained.

| Compounds | Initial Foam Height, mm. | Foam Height After 5 Min., mm. |
|---|---|---|
| Compound A | 88 | 85 |
| Compound B | 155 | 152 |
| Compound C | 162 | 160 |

It may be seen clearly from these results that removal of suspended solid from a product prepared from an undistilled amine (compound A) increased the foaming properties by almost 200% and made them, within the limits of measurement ability, equal to the foaming properties of a product prepared from a distilled amine (compound C).

Somewhat less spectacular, but still of extreme importance, is the comparison of the detergency of compounds A, B and C. Filtration of compound A to obtain compound B improved the detergency, as measured in a standard Launderometer test, by 4–6%. This made it entirely comparable to the detergency properties of compound C. Similarly, filtration of compound A to obtain compound B improved wetting properties, as measured by the standard canvas disc wetting test, so that at 0.1% concentration the wetting time decreased from 45 seconds to 38 seconds. This, again, was comparable to the behavior of compound C.

In the filtration, 7.33%, on the basis of active ingredient, was removed. As indicated above, distillation of the crude amine, on the other hand, provided 14.5% of a valueless residue. Obviously, therefore, the use of undistilled amine resulted in less of a loss than is suffered when the amines are first distilled.

Similar beneficial results are obtainable when the same technique is applied to $\beta$ aminopropionates derived from amines of other lengths within the group of $C_8$ to $C_{22}$.

I claim as my invention:

1. Process of making surfactants having the formula $RNHCH_2CH_2COOM$ in which R is an aliphatic hydrocarbon group containing from 8–22 carbon atoms and M is a salt-forming group which comprises reacting an undistilled fatty amine $RNH_2$ with a lower aliphatic ester of acrylic acid to produce the corresponding $\beta$ amino propionate ester, hydrolyzing said ester with an aqueous solution of an alkaline material, adjusting a pH of the solution to within the range of 6.5–11.0 except for the range of 8–10, to produce a low viscosity and separating suspended material from the aqueous solution.

2. Process of making surfactants having the formula $RNHCH_2CH_2COOM$ in which R is an aliphatic hydrocarbon group containing from 8–22 carbon atoms and M is a salt-forming group which comprises reacting an undistilled fatty amine $RNH_2$ with a lower aliphatic ester of acrylic acid to produce the corresponding $\beta$ amino propionate ester, hydrolyzing said ester with an aqueous solution of an alkaline material, adjusting a pH of the solution to within the rang of 6.5 to 8 to produce a low viscosity and separating suspended material from the aqueous solution.

3. Process of making surfactants having the formula $RNHCH_2CH_2COOM$ in which R is an aliphatic hydrocarbon group containing from 8–22 carbon atoms and M is a salt-forming group which comprises reacting an undistilled fatty amine $RNH_2$ with a lower aliphatic ester of acrylic acid to produce the corresponding $\beta$ amino propionate ester, hydrolyzing said ester with an aqueous solution of an alkaline material, adjusting a pH of the solution to within the range of 10 to 11 to produce a low viscosity and separating suspended material from the aqueous solution.

References Cited in the file of this patent

UNITED STATES PATENTS 2,468,012  Isbell  Apr. 19, 1949

OTHER REFERENCES

Noller-Chemistry of Organic Compounds, 1951, page 287.